J. W. HATCH.

Assignor to H. G. THOMPSON, Trustee of THE MAGNETIC LASTING MACHINE ASSOCIATION.

Machinery for Lasting the Uppers of Boots and Shoes.

No. 8,927. Reissued Oct. 14, 1879.

WITNESSES.

L. F. Connor.

J. F. Cronin

INVENTOR.

Jesse W. Hatch

BY Crosby & Gregory

ATTY'S

N. PETERS, PHOTO-LITHOGRAPHER, WASHINGTON, D. C.

UNITED STATES PATENT OFFICE.

JESSE W. HATCH, OF ROCHESTER, N. Y., ASSIGNOR TO HENRY G. THOMPSON, TRUSTEE OF THE MAGNETIC LASTING MACHINE ASSOCIATION.

IMPROVEMENT IN MACHINERY FOR LASTING THE UPPERS OF BOOTS AND SHOES.

Specification forming part of Letters Patent No. 173,405, dated February 15, 1876; Reissue No. 8,927, dated October 14, 1879; application filed May 19, 1879.

*To all whom it may concern:*

Be it known that I, JESSE W. HATCH, of the city of Rochester, in the county of Monroe and State of New York, have invented certain new and useful Improvements in Machinery for Lasting the Heels and Toes (either or both) of Boots and Shoes, of which the following is a specification.

My invention has for its object such an organization or construction of the jaws for crimping or lasting the heel and toe of the boot or shoe as will enable them to be operated upon and actuated by mechanism co-operating with the backwardly-extended shanks of the jaws, whereby the space opposite the shank of the shoe and about the ball of the foot is not obstructed, but left free to be operated upon to be lasted without interference with the jaws or their actuating mechanism.

In this my machine both members of the pair of crimping-jaws have a common pivot, and the jaws move forward over the last-bottom and inner sole as they are closed to crimp the upper upon the last at toe and heel. The said jaws by such horizontal and closing movement fit the upper snugly about the edge of the last, and force or carry, by their acting edges, the crimps or plaits in the heel and toe to the inner margin of the upper, laid over upon the inner sole, leaving the edge of the upper in proper condition to be tacked. The effect of these movements of the jaws is to form a better seat or bend in the upper, where it is laid over upon the inner sole at the heel and toe of the last.

Figure 1:
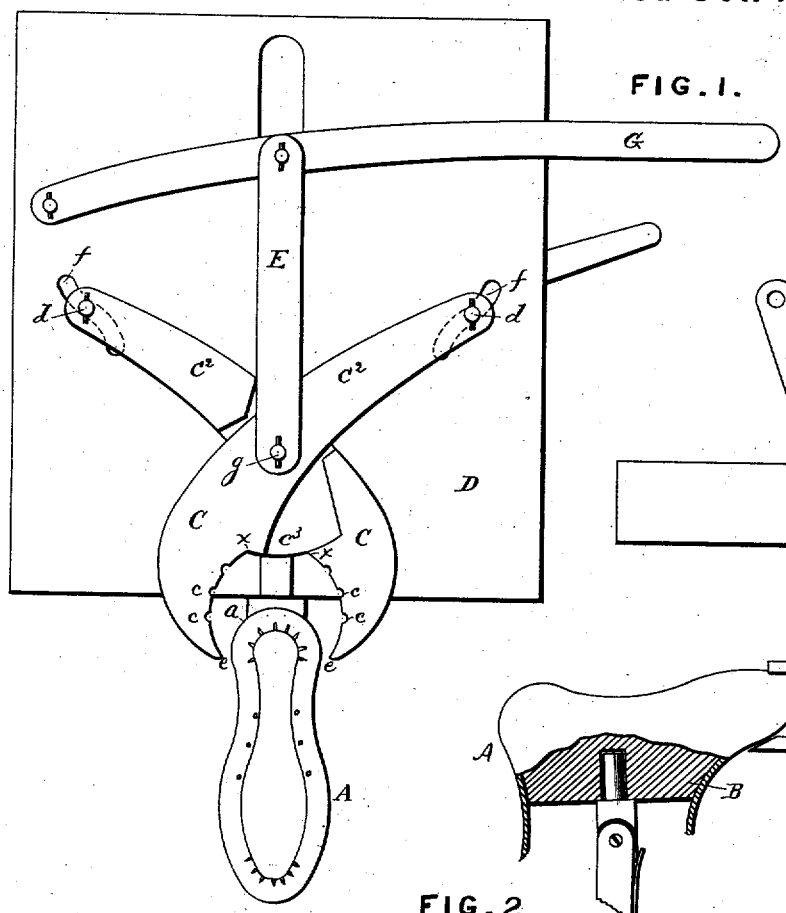
Figure 4:
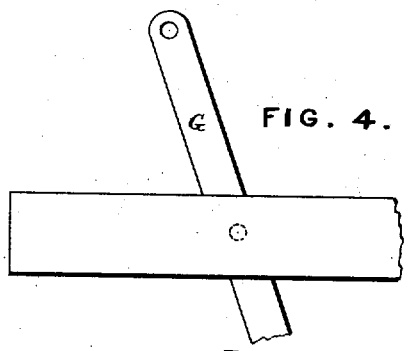
Figure 3:
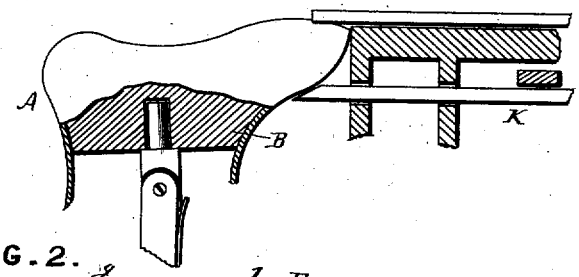
Figure 2:
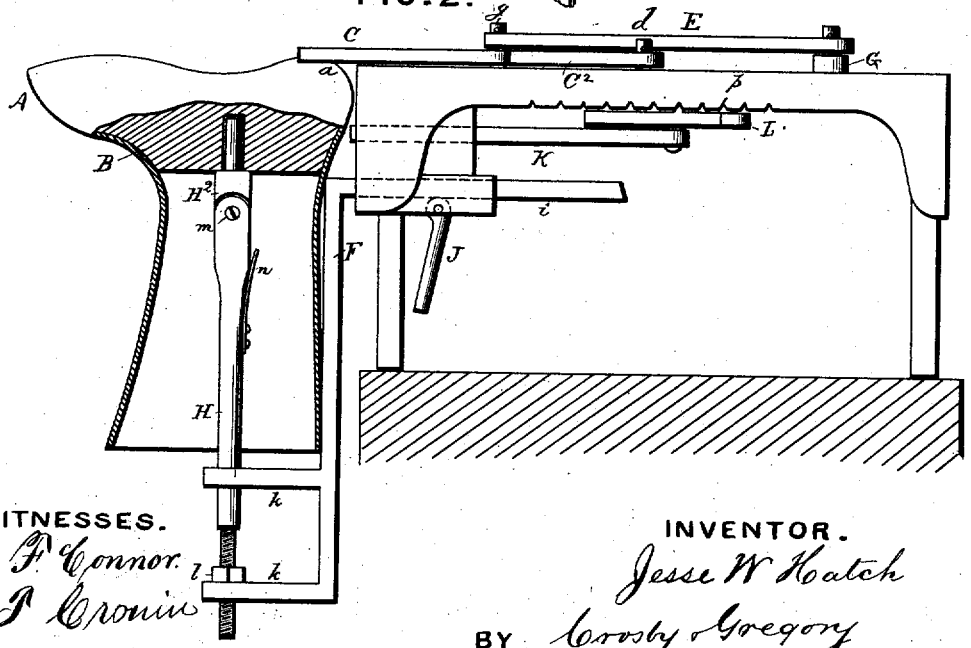

Figure 1 is plan of a boot with its heel presented near the crimping-jaws for lasting; Fig. 2, a side elevation of the same; Fig. 3, a similar view to Fig. 2, but showing the toe of the boot presented to the jaws instead of the heel; and Fig. 4 a plan of the toe-rest and its lever removed from place.

A, Figs. 1 and 2, represents a boot with the upper applied upon the usual last B, in condition for crimping the heel, preparatory to applying the outer sole thereto.

The upper is first drawn over the last in the ordinary way by hand, and the edges are then tacked to the insole at the sides by two or three tacks to secure the parts together. The last is then placed on a suitable support, and the heel or toe presented in proper position to be acted upon by the crimping-jaws or equivalent devices, which, being moved horizontally over the end of the last, and being closed, act upon the edge of the upper to crimp the said edge and lay it on the inner sole, to be there secured by tacks.

The jaws or equivalents are so arranged as to draw the upper in upon all sides, thereby leaving the seat *a*, or the rounded portion of the upper where the outer sole joins it, perfectly smooth, the wrinkles or crimps all being drawn into the inner edge, as shown at *b*.

The jaws may be provided with notches or holes *c c* at their inner edges, for the reception of the tacks that pass into the leather.

In the drawings, D is a table or bed, on top of which are mounted the crimping-jaws C C.

The jaws have backwardly-extended shanks $C^2 C^2$, shown as provided at their ends with pins *d d*, which rest in slots *f f* of the table or bed, the slots having such curvature as will cause the jaws to close properly upon the leather of the upper at the edge of the last as the jaws are thrown forward.

The central pivot, *g*, common to both the jaws, is connected with a pitman, E, which may receive its motion from a hand-lever, G, or from any automatic power desired. As this lever is drawn forward the jaws close upon the leather.

F is a vertical support, having a horizontal arm, *i*, which passes through a bearing in the bed, so as to be moved out or in; and it is secured in any position by a cam, J, or equivalent. At its lower end the support has two horizontal bearings, *k k*, through which passes the standard H that supports the last.

The lower end of the standard is cut with a screw-thread, and is provided with a nut, *l*, by which the standard is adjusted higher or lower, to enable either the heel or the toe of the boot to be presented to the crimping-jaws by reversing it.

The upper end of the standard has a joint-piece, $H^2$, pivoted at *m*, and is kept stiff by a spring, *n*. This is for the purpose of allowing the last to be turned or inclined back, as in Fig. 3, when the toe is presented to the crimping-jaws, so that the toe will lie flat or in line for the jaws to pass over. The last is simply swiveled on the end of the joint-piece, so that it can swing around, and it is held firm by the hand of the operator while the crimping action is performed.

K is a toe-rest, which slides in and out horizontally, being operated by means of a lever, L, which is held in position by means of a lug and notches, *p p*, or any equivalent arrangement. This toe-rest is used only when the toe of the boot or shoe is being lasted, in which case it is thrown out, as shown in Fig. 3, and supports the front of the last under the pressure of the crimping-jaws.

When the heel is being crimped it is thrown back, as shown in Fig. 2.

From the above description the operation of the machine will be obvious.

The last is placed upon the swivel-standard with the line of the boot or shoe in position to receive the crimping-jaws.

The passage forward and closing-in of the jaws will last the heel in shape, and the edges of the upper so lasted may then be tacked.

If desired, several strokes may be given to the jaws, which may be necessary with very thick or heavy leather.

Any desired number of the heels may be crimped in this way in succession, and the machine may then be set to crimp toes. To do this the support F is drawn out to enable the last to be applied, as in Fig. 3.

The joint-piece $H^2$ is of importance for this purpose, as it bends back to bring the surface of the toe in line with the crimping-jaws.

It is obvious that the heels and toes may be lasted alternately in the same manner, and the whole finished without removing the boot or shoe from the standard till complete.

By providing the jaws with shanks $C^2$, as described, which are operated upon to close the jaws and open them at their proper periods, the crimping portions of the jaws in front of the pivot *g* are left entirely free to be placed against the upper of the shoe or boot at its heel or toe and be closed together to crimp the said heel or toe.

The jaws project beyond the end of the table, over and along which the pivot *g* moves when the jaws are reciprocated, and the jaws in front of the said pivot *g* have no connection with any other device, so that the part of the shoe not acted upon by the jaws is free to be operated upon about the shank and ball of the foot part of the last or upper, as may be desired.

The jaws C, held by a pivot, *g*, common to both, and lapped one over the other, have their inner edges, which act against the upper to crowd it over the last, so shaped as to form an unbroken acting edge.

In the drawings the under jaw is shown as provided with a wing, $c^3$, which bridges the space between the portions *x x* of the open jaws when they are being moved forward and closed, the wing $c^3$ then forming the acting-edge of the jaws in front of the pivot, and consequently there is never a space or open slot between the jaws or their edges in which the leather can be jammed or caught as the jaws in their forward movement are being closed.

I claim—

1. In a lasting-machine, two crimping-jaws having backwardly-extended shanks, by which to open and close them, the two jaws having concaved acting edges, and being pivoted, the one with relation to the other, substantially as described, whereby the said acting edges are made continuous or without gaps or spaces for the entrance of the upper as it is being crowded by the acting edges of the said jaws over upon the inner sole, substantially as set forth.

2. In a lasting-machine, crimping-jaws provided with backwardly-extended shanks, combined with mechanism to move the jaws longitudinally, and simultaneously open or close them, to operate substantially as described.

3. In a lasting-machine, a pair of shanked crimping-jaws having a pivot common to both, one of the said jaws being provided with a wing, $c^3$, to bridge the space between the open jaws and prevent the upper being crimped from being caught between the jaws near their pivot as the jaws are moved forward and closed, substantially as described.

4. The crimping-jaws C C, having shanks $C^2$ $C^2$, with pins *d*, in combination with the pitman E, lever G, and table D, having slots *f f*, substantially as described.

5. The combination, with the crimping-jaws C C and standard H $H^2$, of the toe rest K, operating as and for the purpose specified.

6. In a lasting-machine, two crimping-jaws, substantially as described, having a pivot common to both, each jaw being provided with rearwardly-projecting shanks, by which to open and close the jaws, substantially as set forth.

JESSE W. HATCH.

Witnesses:

JOHN L. HATCH,

CHAS. B. HATCH.